Patented Apr. 2, 1940

2,195,798

UNITED STATES PATENT OFFICE 2,195,798

DRILLING FLUID

Philip H. Jones, Redondo Beach, and Arthur L. Blount, Palos Verdes Estates, Calif., assignors to Union Oil Company of California, Los Angeles, Calif., a corporation of California No Drawing. Original application October 20, 1936, Serial No. 106,560. Divided and this application February 18, 1938, Serial No. 191,270

3 Claims. (Cl. 255—1)

This invention relates to drilling wells and particularly to a method of determining the connate water content of earth formations penetrated by drilled wells, and is a division of our copending application Serial No. 106,560 which was filed October 20, 1936.

In the calculation of the potential production of natural petroleum containing formations it is necessary to know the proportion of the intersticial space volume in such formations which is available for oil and gas storage. In making such calculations, it is not only necessary to know the total porosity of the sand or shale formations comprising the petroliferous reservoir but it is also necessary to know what proportion of this pore space is occupied by connate water.

Quantitative determinations of the connate water content of the drilled formations must be made by examining cores taken from the formation. These cores are obtained by core drilling usually while employing mud as the circulating drilling fluid, and under these conditions it is necessary to know the degree of contamination of the recovered core with water which has penetrated into the core from the drilling mud before the connate water content can be ascertained.

Objects of this invention are, therefore, to present a method for the quantitative determination of the contamination of oil sands with water from the drilling fluids. It is also an object of this invention to present a method for the quantitative determination of the connate water content of the cored oil producing formations.

The method of the present invention for determining the degree of contamination of cores by drilling fluid comprises in brief adding and maintaining a known concentration of a tracer in solution in the water in the drilling fluid employed during core drilling through the formation in question, and subsequently testing a portion of the recovered core to determine the quantity of the tracer present in the core as a result of the penetration of the drilling fluid water into the core. Other tests are made to determine the total water content of the core and from these data the quantity of the water originally present in the formation is readily computed.

We have discovered that a tracer suitable for the quantitative determination of the degree of contamination of the core sample with water from the drilling mud must be of such a character that it will stay in solution in the water regardless of the conditions met in the drilling process. The tracer must not damage the mud, it must be stable and not undergo chemical changes within the mud or upon contact with the formation fluids and minerals, it must not be adsorbed in the clay in the drilling fluid nor in the materials comprising the penetrated formations, it must be preferentially soluble in the water and relatively insoluble in the oil present in the formation, it must remain in unchanged concentration with the water as it migrates through the formation and its presence must be susceptible to accurate quantitative determinations at low concentration in small amounts by an analytical method not rendered inaccurate by the contamination of the accompanying water nor by the oil, sand, clay and various minerals with which the water containing the tracer may be associated.

Tracers such as arsenic trioxide and lithium were tested but found to be unsatisfactory for the reason that they were readily absorbed by the clay in the mud and by the sands of the formation, resulting in failure of the tracer to penetrate the cored sample with the water in the proportion in which it was originally present in the water of the drilling fluid. Arsenic and lithium, while they have been used heretofore as tracers to determine the path of flow of subterranean waters, were in this connection thus proved to be entirely unsuitable for making quantitative tests. Many dyes such as fluorescein, eosine and magenta and other similar tracers which are otherwise susceptible to satisfactory analytical procedures for the detection of their presence in water are adsorbed by the mud and sand and do not pass into the formation with the water from the drilling mud in the proportion in which they were added to the water in the mud. On the other hand, many organic tracers which are not open to the above objection are not detectable in small quantities and are soluble in or altered by the mud, the formation materials or by oil and gas.

We have discovered, however, that certain of the reducing sugars are stable and suitable for use as tracers to be added to the drilling mud in small quantities and are capable of being quantitatively detected by copper reduction test methods in low concentrations in the formational waters. These sugars which are suitable as tracers may be classed under three main heads, the monosaccharides, the disaccharides containing an aldehyde group and the aliphatic aldehydes. Under the first group, the aldopentoses such as arabinose and xylose and the aldohexoses such as glycose or dextrose have been found suitable as sensitive tracers. Under the second group maltose and lactose are suitable. Under the third group acetaldehyde, butyraldehyde, crotonaldehyde, hydroxyaldehyde, aldol glycollaldehyde and glyceraldehyde are suitable.

Of the above group of reducing sugars, dextrose has proven to be particularly satisfactory. Dextrose can be determined quantitatively in minute quantities by the cuprous-chloride-iodide method described by F. M. Scales in the Journal of Ind. and Eng. Chem., Aug. 1919, page 747. This method is applicable to water samples contaminated with mud, oil, gas, sand and other substances associated with the core sample under test, and the dextrose is not adsorbed or altered materially by any of these materials.

Dextrose and certain of the other reducing sugars do not damage the mud, but in time are subject to fermentation. To prevent this, a modicum of a preservative or germicide antiseptic such as o-phenylphenol, p-tertiary amylphenol, cresol or phenol is added to the mud-sugar mixture. These germicides are effective in quantities ranging from 0.02 to 0.002 percent by weight of the water in the mud and do not interfere with the subsequent quantitative testing methods. When these preservatives are employed, the mud is more susceptible to gas cutting but the addition thereto of an anti-gas cutting agent such as octyl alcohol has been effective in counteracting this tendency. Octyl alcohol alone to the extent of 0.05 percent by weight of the water in the mud, was found to prevent this fermentation and its presence does not interfere with the dextrose determinations or impair the quality of the mud.

An example of the process for the determination of the degree of contamination of the connate water content of cored oil containing formations is as follows:

The drilling well to be tested was at a depth of 3067 feet and located in an area where water-free production in the order of 400–500 barrels per day was known to be available. The bottom hole pressures in the wells in the same vicinity were of the order of 600 pounds per square inch. The sands in the zone to be cored and tested were medium to coarse grained, well sorted and substantially free from cementing material.

Dextrose and octyl alcohol were added to the drilling mud and thoroughly mixed by circulation through the system for thirty minutes before resuming drilling operations. Then three eighteen-foot cores were taken during which time samples of the drilling mud stream were taken at frequent intervals for testing to determine the concentration and uniformity of distribution of the dextrose throughout the circulating mud stream. The average dextrose concentration throughout the mud stream while coring was 0.80 percent by weight.

Immediately after the core was removed from the core barrel, representative samples were broken down to grain size, and each sample was divided into two parts. One part of each sample of approximately 175 grams was charged into an iron retort which was heated slowly to a dull red heat, held at that temperature for an hour and then allowed to cool. The condensate from each retort was recovered, centrifuged for five minutes and its water and oil contents read to the closest 0.1 milliliter. After the retorts had cooled, the sands were removed from them and weighed.

The oil and water contents thus obtained were corrected for the oil and water losses occurring in retorting. These losses were determined by retorting mixtures of known quantities of oil, water and previously retorted sand. A correction was also made for the amount of water of crystallization recoverable from the materials of the core.

Porosity determinations of the same core materials were made by a Coberly-Stevens hydrogen porosimeter. The core samples tested in the porosimeter were previously leached with carbon tetrachloride in Soxhlet extractors and then dried at 215° F. to remove the included water and oil from the pore spaces.

The average oil-free dry sand densities of the core samples under test were determined by the pycnometer-tetrachlorethane method and were used to correlate the core contents with core pore volumes. Each of the other parts of the beforementioned broken down representative core samples was employed for the dextrose content analysis. Each one of the samples was weighed and then mixed with 25 millilitres of distilled water. After settling, 10 millilitres of supernatant liquid was pipetted from each test sample mixture and its dextrose content determined by the cuprous-chloride-iodine method as mentioned hereinbefore.

The data thus determined by the above tests comprised the weight of the sand plus the oil and water in the samples, the weights of the oil and water originally present in the samples, the volume of the water added, the volume of the aliquot portions of water removed for the dextrose determination tests and finally the dextrose contents of the said aliquot portions. From these data the average quantity of water found in the core sample which had penetrated from the drilling mud was computed. From these data the average connate water content of the core sample is also obviously determinable.

Table I gives the average results of these tests as performed and described hereinbefore upon twenty-eight test sample portions of an oil sand core recovered from the drilling well before mentioned.

Table I

| Depth, feet | Sand texture | Vol. oil ml./100 g. dry sand | Vol. connate water ml./100 g. dry sand | Vol. drillings water ml./100 g. dry sand | Total fluid vol. ml./100 g. dry sand | Effective pore vol. ml./100 g. dry sand | Percent effective pore vol. filled by total fl. |
|---|---|---|---|---|---|---|---|
| 3092 | Med. coarse | 4.86 | 6.01 | 2.47 | 13.35 | 16.21 | 82.4 |
| | | | | Total effective porosity, percent. | Total effective pores filled with connate water, percent. | Net effective porosity: (exclusive of connate water) percent. | Oil saturation, percent of net effective pores. |
| | | | | 29.7 | 37.9 | 18.6 | 49.5 |

Phenol in quantities ranging from 0.5 to 0.25 percent and nicotine in quantities ranging from 0.5 to 5.0 percent may also be employed successfully as a tracer in place of the dextrose as just described. When phenol is employed its content in the core test samples is determined in a manner similar to that just described but employing the Koppeshaar method of quantitative phenol determinations. When nicotine is employed as the tracer, the silicotungstate and method as described in the publication of the Association of Official Agricultural Chemistry, Methods of Analysis, is employed for its final quantitative detection.

The method of this invention is not necessarily limited to the determination of connate water in oil or gas producing formations but may include similar determinations in any porous medium or to trace the flow of any aqueous liquid such as the water in mud or sewage through any porous medium.

We claim:
1. A drilling fluid adapted to the determination of the degree of contamination of the drilled earth core sample comprising water carrying heavy solids in suspension and nicotine in solution.
2. A drilling fluid adapted to the determination of the degree of contamination of the drilled earth core sample comprising water carrying heavy solids in suspension and nicotine in the order of 0.5% by weight of water in solution.
3. A drilling fluid adapted to the determination of the degree of contamination of the drilled earth core sample comprising water carrying clayey solids in suspension and nicotine in solution.

PHILIP H. JONES.
ARTHUR L. BLOUNT.